US011735995B2

(12) United States Patent
Suzuki et al.

(10) Patent No.: US 11,735,995 B2
(45) Date of Patent: Aug. 22, 2023

(54) MULTI-PHASE POWER CONVERTER WITH DRIFT CURRENT

(71) Applicant: KEIHIN CORPORATION, Tokyo (JP)

(72) Inventors: Takami Suzuki, Utsunomiya (JP); Yuta Nakamura, Utsunomiya (JP); Kazunari Kurokawa, Oyama (JP); Takuma Kato, Sakura (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/252,399

(22) PCT Filed: Jun. 4, 2019

(86) PCT No.: PCT/JP2019/022089
§ 371 (c)(1),
(2) Date: Dec. 15, 2020

(87) PCT Pub. No.: WO2019/244614
PCT Pub. Date: Dec. 26, 2019

(65) Prior Publication Data
US 2021/0159799 A1 May 27, 2021

(30) Foreign Application Priority Data
Jun. 18, 2018 (JP) .................. 2018-115547

(51) Int. Cl.
*H02M 3/158* (2006.01)
*H02M 1/00* (2006.01)

(52) U.S. Cl.
CPC ....... *H02M 1/0009* (2021.05); *H02M 3/1584* (2013.01); *H02M 3/1586* (2021.05)

(58) Field of Classification Search
CPC ............. H02M 3/1584; H02M 1/0009; H02M 3/1586; H02M 3/1588; H02M 1/084
See application file for complete search history.

(56) References Cited

U.S. PATENT DOCUMENTS 10,181,794 B1 * 1/2019 Chang .................. H02M 3/285
11,476,757 B2 * 10/2022 Tanaka ................ H02M 3/1584
(Continued)

FOREIGN PATENT DOCUMENTS

| JP | 2012210145 A | 10/2012 |
| JP | 2014060851 A | 4/2014 |

(Continued)

OTHER PUBLICATIONS

International Search Report for International Application No. PCT/JP2019/022089; dated Jul. 16, 2019.
(Continued)

*Primary Examiner* — Alex Torres-Rivera
(74) *Attorney, Agent, or Firm* — Cantor Colburn LLP (57) ABSTRACT

A power conversion device having a multi-phase converter in which a plurality of chopper circuits each including a switching element and a reactor connected to the switching element are connected in parallel is provided. The power conversion device includes a single current sensor that is provided on a primary side of the chopper circuit, and detects a phase current flowing through each of the reactors when the switching elements are in both an on state and an off state, and a drift current detection unit configured to detect a drift current of a phase current in the multi-phase converter on the basis of the phase current detected by the current sensor, wherein the current sensor detects a phase current such that directions of phase currents flowing through each of the reactors are the same as each other.

5 Claims, 4 Drawing Sheets

(56) References Cited

U.S. PATENT DOCUMENTS

| | | | | |
|---|---|---|---|---|
| 2007/0069704 | A1* | 3/2007 | Gotzenberger | H02M 3/1584 |
| | | | | 323/282 |
| 2012/0250363 | A1* | 10/2012 | Skinner | H02M 3/1584 |
| | | | | 363/21.12 |
| 2013/0076135 | A1* | 3/2013 | Zhu | H02M 3/1584 |
| | | | | 307/43 |
| 2017/0214318 | A1* | 7/2017 | Takenaka | H02M 1/084 |
| 2018/0097454 | A1* | 4/2018 | Komatsu | H02M 7/49 |
| 2018/0337605 | A1* | 11/2018 | Luo | H02M 1/08 |
| 2019/0229641 | A1* | 7/2019 | Umehara | H02M 7/217 |
| 2020/0403526 | A1* | 12/2020 | Ichiki | H02M 3/1584 |
| 2021/0013803 | A1* | 1/2021 | Tanaka | H02M 3/157 |

FOREIGN PATENT DOCUMENTS

| | | |
|---|---|---|
| JP | 5734441 B2 | 6/2015 |
| WO | 2017169062 A1 | 10/2017 |
| WO | 2017217022 A1 | 12/2017 |

OTHER PUBLICATIONS

JPO Notice of Reasons for Rejection for corresponding JP Application No. 2020-525463; dated Jun. 29, 2021.

\* cited by examiner

MULTI-PHASE POWER CONVERTER WITH DRIFT CURRENT

CROSS REFERENCE TO RELATED APPLICATIONS

This is the U.S. national stage of application No. PCT/JP2019/022089, filed on Jun. 4, 2019. Priority under 35 U.S.C. § 119(a) and 35 U.S.C. § 365(b) is claimed from Japanese Application No. 2018-115547 filed Jun. 18, 2018, the disclosure of which is also incorporated herein by reference.

TECHNICAL FIELD

The present invention relates to a power conversion device.

Priority is claimed on Japanese Patent Application No. 2018-115547, filed Jun. 18, 2018, the content of which is incorporated herein by reference.

BACKGROUND ART

Patent Literature 1 below discloses a multi-phase converter in which two chopper circuits made by combining a switching element and a reactor are connected to each other in parallel. The chopper circuit includes a first chopper circuit and a second chipper circuit.

The multi-phase converter detects a current imbalance (hereinafter referred to as a "drift current") between the first chopper circuit and the second chopper circuit using a single current sensor. The multi-phase converter controls switching of each switching element to reduce a drift current detected by the single current sensor.

The single current sensor detects a first current heading from a reactor of the first chipper circuit to a switching element or a diode and a second current heading from a reactor of the second chopper circuit to a switching element or a diode such that they are in opposite directions. As a result, the single current sensor can detect a drift current that is a difference between a first current and a second current.

CITATION LIST

Patent Literature

Patent Literature 1
  Japanese Patent No. 5734441

SUMMARY OF INVENTION

Technical Problem

The current detected by the single current sensor is the sum of a first current and a second current flowing in a direction opposite to a direction in which the first current flows. For this reason, the first current and the second current are offset from each other. Therefore, a current value detected by the single current sensor may be small, and the detection accuracy of a drift current may decrease.

The present invention has been made in view of such circumstances, and an object thereof is to improve the detection accuracy of a drift current in a multi-phase converter.

Solution to Problem (1) According to one aspect of the present invention, a power conversion device having a multi-phase converter in which a plurality of chopper circuits each including a switching element and a reactor connected to the switching element are connected in parallel is provided. The power conversion device includes a single current sensor that is provided on a primary side of the chopper circuit and detects a phase current flowing through each of the reactors when the switching elements are in both an on state and an off state, and a drift current detection unit configured to detect a drift current of a phase current in the multi-phase converter on the basis of the phase current detected by the current sensor, wherein the current sensor detects a phase current such that directions of phase currents flowing through each of the reactors are the same.

(2) In the power conversion device of (1) described above, the drift current detection unit may detect the drift current on the basis of a change point phase current that is a phase current when the phase current detected by the current sensor changes from an increase to a decrease.

(3) In the power conversion device of (2) described above, when each of the switching elements is switched from an on state to an off state, the drift current detection unit may acquire the phase current detected by the current sensor as the change point phase current.

(4) In the power conversion device according to (2) or (3) described above, a delay unit configured to delay the phase current input from the current sensor to the drift current detection unit by a predetermined time, wherein the drift current detection unit may acquire the phase current from the current sensor at a first timing, and the predetermined time may be a time difference between a second timing at which the switching element is switched from an on state to an off state and the first timing.

(5) In the power conversion device of any one of (2) to (4) described above, the drift current detection unit may detect a current difference between a plurality of the change point phase currents detected by the current sensor as the drift current.

(6) In the power conversion device of any one of (1) to (5) described above, the reactors may be magnetically coupled to each other.

(7) In the power conversion device of any one of (1) to (6) described above, the multi-phase converter may also be a two-phase converter in which two of the chopper circuits are connected to each other in parallel.

Advantageous Effects of Invention

As described above, according to the present invention, it is possible to improve detection accuracy of a drift current.

DESCRIPTION OF EMBODIMENTS

Hereinafter, a power conversion device according to the present embodiment will be described using the drawings.

Figure 1:
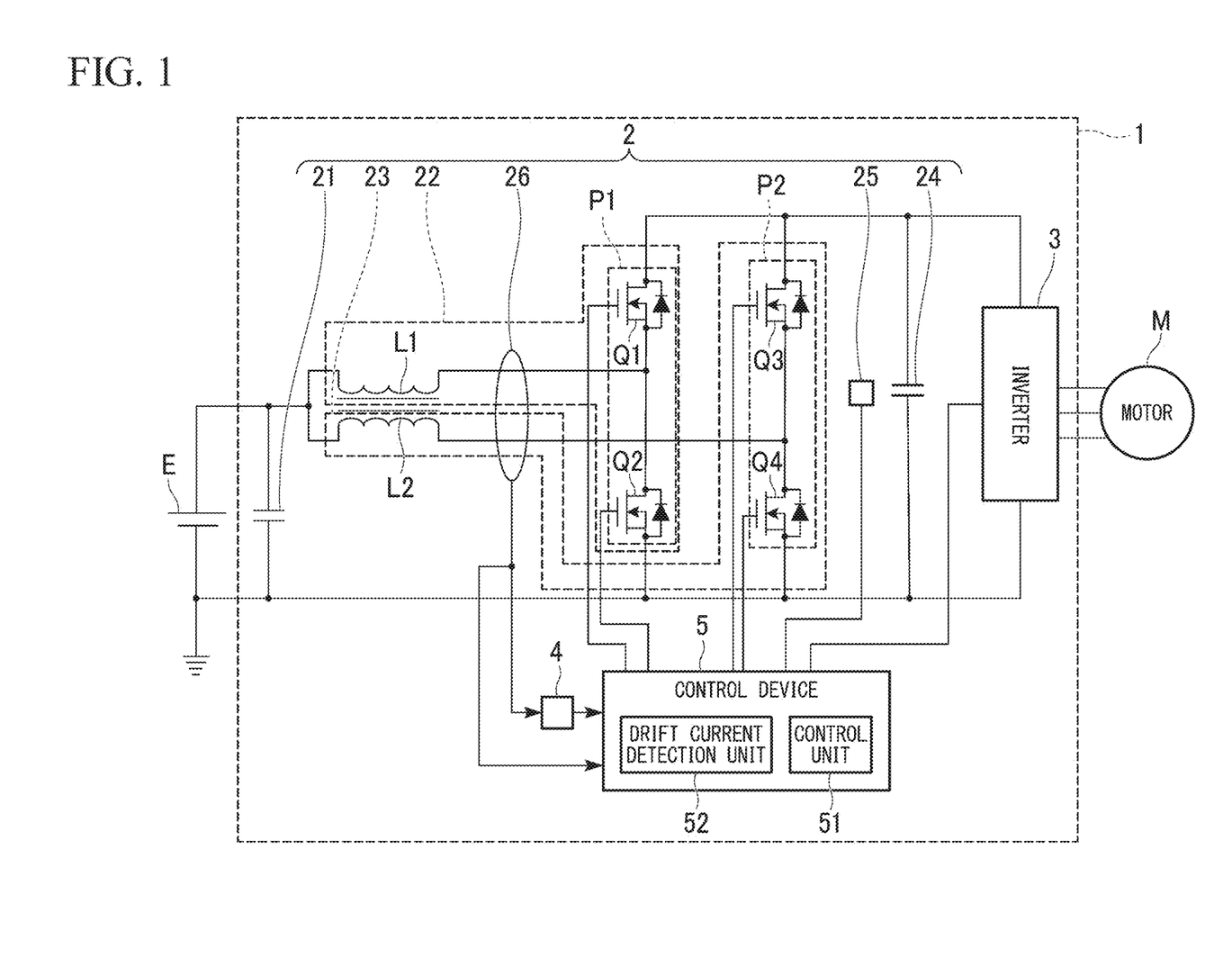
FIG. 1 is a diagram which shows an example of a schematic configuration of a PCU 1 according to the present embodiment.

FIG. 1 is a diagram which shows an example of a schematic configuration of a power conversion device 1 according to the present embodiment. The power conversion device 1 is mounted in a vehicle that travels using a motor M as a power source. For example, the power conversion device 1 is mounted in a vehicle such as a hybrid vehicle or an electric vehicle. For example, the power conversion device 1 is a power control unit (PCU).

As shown in FIG. 1, the power conversion device 1 includes a multi-phase converter 2, an inverter 3, a delay unit 4, and a control device 5.

The multi-phase converter 2 is, for example, an on-vehicle multi-phase DC-DC converter. The multi-phase converter 2 steps up a DC voltage VB input from the DC power supply E to a predetermined voltage Vc (hereinafter referred to as a step-up voltage), and outputs it to the inverter 3. It should be noted that a case in which the multi-phase converter 2 is a two-phase DCDC converter will be described in the present embodiment, but the present invention is not limited thereto, and the number of phases is not particularly limited as long as it is two or more. In the following description, a specific configuration of the multi-phase converter 2 according to the present embodiment will be described.

The multi-phase converter 2 includes a primary-side capacitor 21, chopper circuits 22 and 23, a secondary-side capacitor 24, a voltage detection unit 25, and a current sensor 26.

In the primary-side capacitor 21, a first end is connected to a positive terminal of the DC power supply E, and a second end is connected to a negative terminal of the DC power supply E. The primary-side capacitor 21 is a smoothing capacitor that smoothes a DC voltage VB output from the DC power supply E.

The chopper circuits 22 and 23 are connected in parallel to each other between the DC power supply E and the inverter 3. In the present embodiment, a case in which the chopper circuits 22 and 23 are step-up chopper circuits has been described, but the present invention is not limited thereto, and may be, for example, step-down chopper circuits, and may also be step-up or step-down chopper circuits.

The chopper circuit 22 includes a reactor L1 and a power module P1.

In the reactor L1, a first end is connected to the first end of the primary-side capacitor 21 and a second end is connected to the power module P1.

The power module P1 includes a switching element Q1 and a switching element Q2 connected to each other in series. In the present embodiment, a case in which the switching element Q1 and the switching element Q2 are insulated gate bipolar transistors (IGBTs) will be described, but the present invention is not limited thereto, and the switching elements may also be, for example, field effect transistors (FETs) and the like.

In the switching element Q1, a collector terminal is connected to a first end of the secondary-side capacitor 24, and an emitter terminal is connected to a collector terminal of the switching element Q2.

An emitter terminal of the switching element Q2 is connected to the negative terminal of the DC power supply E.

A connection point between the emitter terminal of the switching element Q1 and the collector terminal of the switching element Q2 is connected to the second end of the reactor L1. Gate terminals of the switching element Q1 and the switching element Q2 are each connected to the control device 5.

The chopper circuit 23 includes a reactor L2 and a power module P2.

In the reactor L2, a first end is connected to the first end of the primary-side capacitor 21, and a second end is connected to the power module P2. The reactor L1 and the reactor L2 are magnetically coupled to each other.

The power module P2 includes a switching element Q3 and a switching element Q4 connected to each other in series. In the present embodiment, a case in which the switching element Q3 and the switching element Q4 are IGBTs will be described, but the present invention is not limited thereto, and the switching elements may also be, for example, FETs or the like.

In the switching element Q3, a collector terminal is connected to the first end of the secondary-side capacitor 24, and an emitter terminal is connected to a collector terminal of the switching element Q4.

An emitter terminal of the switching element Q4 is connected to the negative terminal of the DC power supply E.

A connection point between the emitter terminal of the switching element 3 and the collector terminal of the switching element Q4 is connected to the second end of the reactor L2. Gate terminals of the switching element Q3 and the switching element Q4 are each connected to the control device 5.

In the secondary-side capacitor 24, the first end is connected to the collector terminals of the switching elements Q1 and Q2, and a second end is connected to the negative terminal of the DC power supply E. The secondary-side capacitor 24 is a smoothing capacitor.

The voltage detection unit 25 detects a potential difference between both ends of the secondary-side capacitor 24. A voltage difference between both ends of the secondary-side capacitor 24 is a step-up voltage Vc stepped up by the chopper circuits 22 and 23. The voltage detection unit 25 outputs the detected step-up voltage Vc to the control device 5.

The current sensor 26 is provided on primary sides of the chopper circuits 22 and 23 and detects phase currents of both of a first phase current IL1 and a second phase current IL2 which flow in the same direction. The current sensor 26 is a single current sensor. The current sensor 26 detects a phase current (hereinafter referred to as a "total phase current") IPN of a total of the first phase current IL1 and the second phase current IL2, and outputs it to the drift current detection unit 52. The primary sides of the chopper circuits 22 and 23 are between the positive terminal of a current power supply E and the connection point of the emitter terminal of the switching element Q1 and the collector terminal of the switching element Q2, and between the positive terminal of the current power supply E and the connection point of the emitter terminal of the switching element Q3 and the collector terminal of the switching element Q4.

The inverter 3 converts the step-up voltage Vc output from the multi-phase converter 2 into an AC voltage under control of the control device 5. The inverter 3 supplies the converted AC voltage to the motor M.

The delay unit 4 delays an output from the current sensor 26 by a predetermined time and transmits it to the control device 5. For example, the delay unit 4 is a low pass filter.

The control device 5 includes a control unit 51 and a drift current detection unit 52.

The control unit 51 controls driving of the chopper circuits 22 and 23. Specifically, the control unit 51 controls switching of a pair of switching elements Q1 and Q2 and a pair of switching elements Q3 and Q4 at different timings. As a result, currents with different phases (for example, a phase difference of 180°) flow through the chopper circuits 22 and 23.

The control unit 51 causes a current to flow through the reactor L1, the switching element Q2, and the negative terminal of the DC power supply E by controlling the switching element Q2 to be in an on state, thereby accumulating energy in the reactor L1. Then, the control unit 51 supplies the energy accumulated in the reactor L1 to the secondary-side capacitor 24 through the switching element Q1 by controlling the switching element Q2 to be in an off state, thereby stepping up the DC power supply VB. The current (hereinafter referred to as a "phase current") flowing through the reactor L1 when the switching element Q2 is in both the on state and the off state is referred to as a first phase current IL1.

The control unit 51 causes a current to flow through the reactor L2, the switching element Q4, and the negative terminal of the DC power supply E by controlling the switching element Q4 to be in the on state, thereby accumulating energy in the reactor L2. Then, the control unit 51 supplies the energy accumulated in the reactor L2 to the secondary-side capacitor 24 via the switching element Q3 by controlling the switching element Q4 so as to be in the off state, thereby stepping up the DC power supply VB. A current (hereinafter, referred to as a "phase current") flowing through the reactor L2 when the switching element Q4 is in both the on state and the off state is referred to as a second phase current IL2.

The multi-phase converter 2 operates as a two-phase DCDC converter. For this reason, flow directions of the first phase current IL1 and the second phase current IL2 are the same. That is, when the first phase current IL1 flows from the DC power supply E to the power module P1 via the reactor L1, the second phase current IL2 flows from the DC power supply E to the power module P2 via the reactor L2.

The control unit 51 controls switching of each of the switching elements Q1 and Q2 and the switching elements Q3 and Q4 using pulse width modulation (PWM) to reduce a current difference between the first phase current IL1 and the second phase current IL2 (hereinafter referred to as a "drift current"). Specifically, the control unit 51 outputs a first PWM signal to the switching elements Q1 and Q2 and outputs a second PWM signal whose phase is different from that of the first PWM signal by 180° to the switching elements Q3 and Q4. As a result, the multi-phase converter 2 can generate a stable step-up voltage Vc with fewer ripples.

Figure 2:
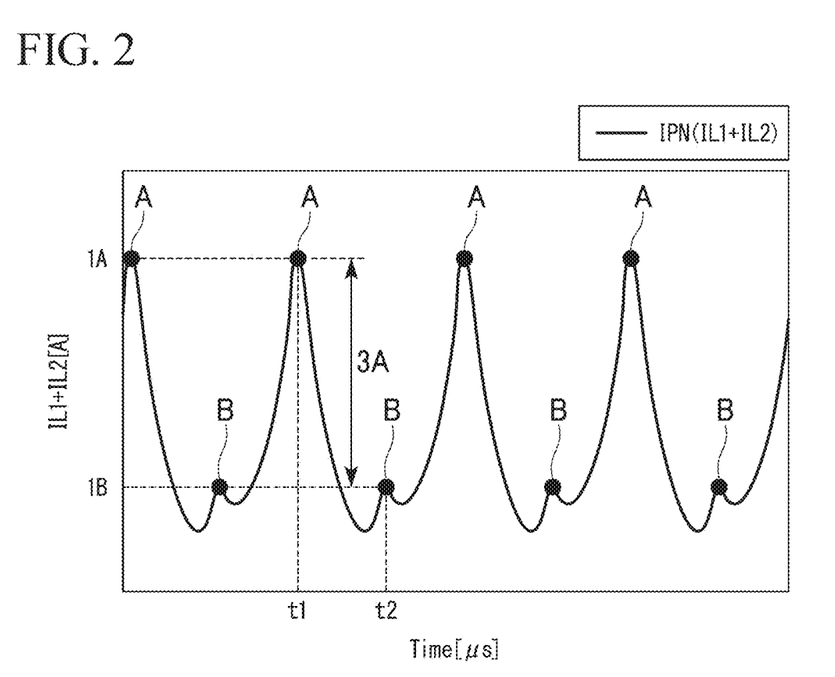
FIG. 2 is a diagram which shows an example of a waveform of a total phase current IPN detected by a current sensor 26 according to the present embodiment.

The drift current detection unit 52 detects a drift current between phases of the first phase current IL1 and the second phase current IL2 on the basis of the total phase current IPN detected by the current sensor 26. In the following description, a method of detecting a drift current according to the present embodiment will be described with reference to FIG. 2. FIG. 2 is a diagram which shows an example of the waveform of the total phase current IPN detected by the current sensor 26.

As shown in FIG. 2, a waveform of the total phase current IPN detected by the current sensor 26 has roughly two change points A and B. The change points A and B are points at which the total phase current IPN changes from an increase to a decrease.

For example, the change point A indicates a timing (time t1) at which the switching element Q2 is switched from the on state to the off state. Therefore, the total phase current IPN at the change point A indicates a maximum value of the first phase current IL1. The change point B indicates a timing (time t2) at which the switching element Q4 is switched from the on state to the off state. Therefore, the total phase current IPN at the change point B indicates a maximum value of the second phase current IL2.

The reactor L1 and the reactor L2 have a characteristic that the self-inductance decreases as a current flowing through the phases thereof increases. For this reason, a ripple current of the phase current increases as the phase current increases. Therefore, in a waveform of the total phase current, there is a deviation in a maximum value of the total phase current at the change point A and the change point B according to a drift current. In the present embodiment, since a phase difference in switching between the switching elements Q1 and Q2 and the switching elements Q3 and Q4 is 180°, the change point A and the change point B occur alternately every 180°.

The drift current detection unit 52 detects a drift current on the basis of the total phase current (hereinafter referred to as a "change point phase current") when the total phase current IPN detected by the current sensor 26 changes from an increase to a decrease. That is, the drift current detection unit 52 detects a difference between a change point phase current IA that is the total phase current IPN at the change point A and a change point phase current IB that is the total phase current IPN at the change point B as a drift current in the total phase current IPN detected by the current sensor 26.

A method of acquiring the change point phase current IA and the change point phase current IB in the drift current detection unit 52 is not particularly limited, and it can be acquired by either of the following methods (a) and (b), for example.

(a) The drift current detection unit 52 acquires the change point phase current A and the change point phase current B by acquiring the total phase current IPN when it changes from an increase to a decreases within a predetermined period among the total phase currents IPNs detected by the current sensor 26.

(b) The drift current detection unit 52 acquires each of the total phase current IPNs output from the current sensor 26 when each of the switching elements Q2 and Q4 is switched from the on state to the off state as the change point phase current A and the change point phase current B, respectively.

In (b) described above, the drift current detection unit 52 acquires the change point phase current A and the change point phase current B by synchronizing a timing (hereinafter referred to as an "acquisition timing") at which the total phase current IPN is acquired from the current sensor 26 and each timing at which the switching elements Q2 and Q4 are turned off.

Figure 3:
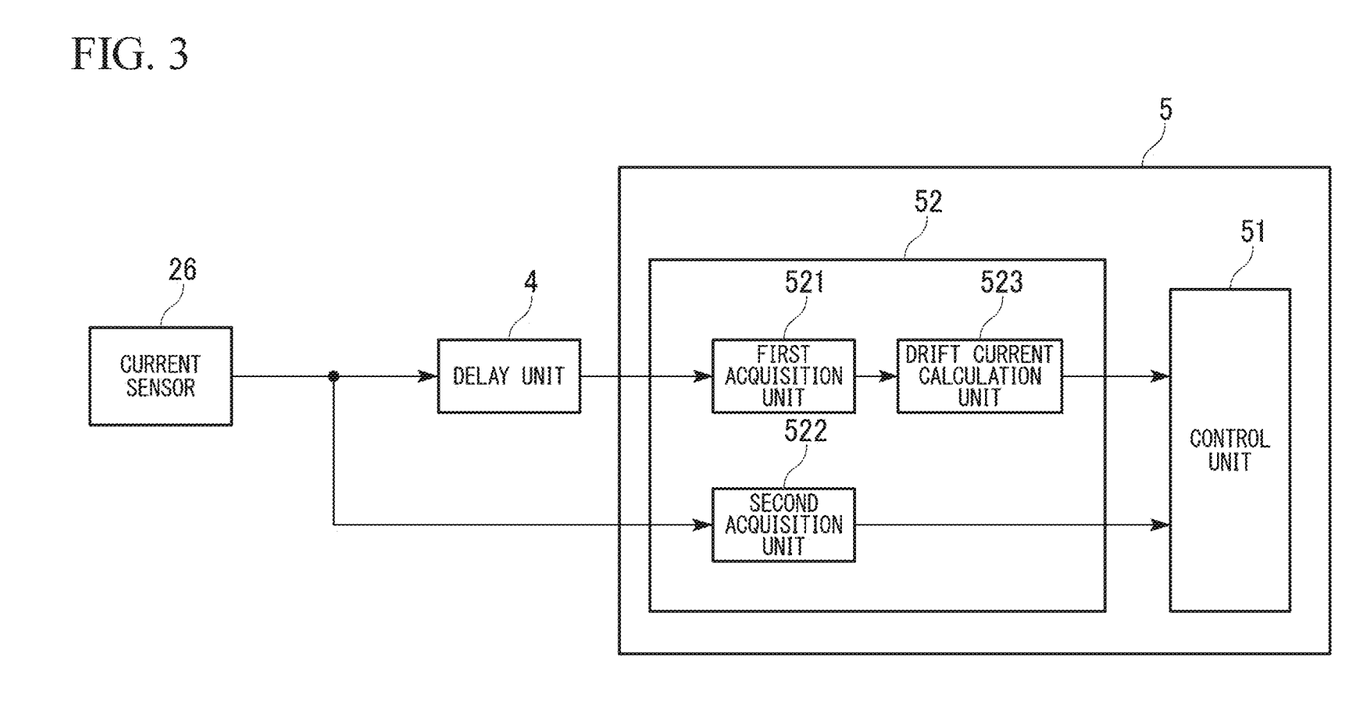
FIG. 3 is a schematic configuration diagram of a drift current detection unit 52 according to the present embodiment.

However, when the acquisition timing by the drift current detection unit 52 and each timing at which the switching elements Q2 and Q4 are turned off cannot be synchronized, the drift current detection unit 52 can acquire the change point phase current IA and the change point phase current IB in the method of (b) described above by providing the delay unit 4 in the power conversion device 1 and configuring the drift current detection unit 52 as shown in FIG. 3.

When the acquisition timing by the drift current detection unit 52 and each timing at which the switching elements Q2 and Q4 are turned off cannot be synchronized, for example, the acquisition timing of the drift current detection unit 52 may be timings of the peak and valley of a carrier wave (a triangular wave) instead of each timing at which the switching elements Q2 and Q4 are turned off. It should be noted that when it is possible to synchronize the acquisition timing by the drift current detection unit 52 with each timing at which the switching elements Q2 and Q4 are turned off even if the delay unit 4 is not provided in (b) described above, the delay unit 4 is not an essential constituent of the power conversion device 1. In the following description, a configuration of the drift current detection unit 52 shown in FIG. 3 will be described.

As shown in FIG. 3, the drift current detection unit 52 includes a first acquisition unit 521, a second acquisition unit 522, and a drift current calculation unit 523.

The delay unit 4 delays the output from the current sensor 26 by a predetermined time and synchronizes a first timing at which the first acquisition unit 521 acquires the total phase current IPN with a second timing at which the switching elements Q2 and Q4 are turned off. For example, the delay unit 4, with a difference between a timing of a peak of the carrier wave (a triangular wave) and a timing of a rising edge of the first PWM signal set as a delay time $\Delta t$, delays the total phase current IPN output from the first acquisition unit 521 for the delay time $\Delta t$ and inputs it to the drift current calculation unit 523. The delay unit 4, with a difference between a timing of a valley of the carrier wave (the triangular wave) and a timing of a rising edge of the second PWM signal set as a delay time $\Delta t$, delays the total phase current IPN output from the first acquisition unit 521 for the delay time $\Delta t$ and inputs it to the drift current calculation unit 523.

The first timing is a timing of each of the peak and valley of the carrier wave (a triangular wave) for generating the first PWM signal and the second PWM signal.

The first acquisition unit 521 acquires the total phase current IPN from the delay unit 4 at a first timing. The first acquisition unit 521 outputs the total phase current IPN acquired at the first timing via the delay unit 4 to the drift current calculation unit 523.

The second acquisition unit 522 acquires the total phase current IPN from the current sensor 26 at the first timing without going through the delay unit 4 and outputs it to the control device 5.

The drift current calculation unit 523 acquires the total phase current IPN as change point phase currents A and B by acquiring the total phase current IPN delayed for a delay time $\Delta t$ by the delay unit 4. In this manner, the delay unit 4 delays the total phase current IPN for the delay time $\Delta t$, and thereby the drift current calculation unit 523 can acquire the change point phase currents A and B at the first timing.

Then, the drift current calculation unit 523 calculates a drift current based on the acquired change point phase currents A and B and outputs it to the control device 5.

Figure 4:
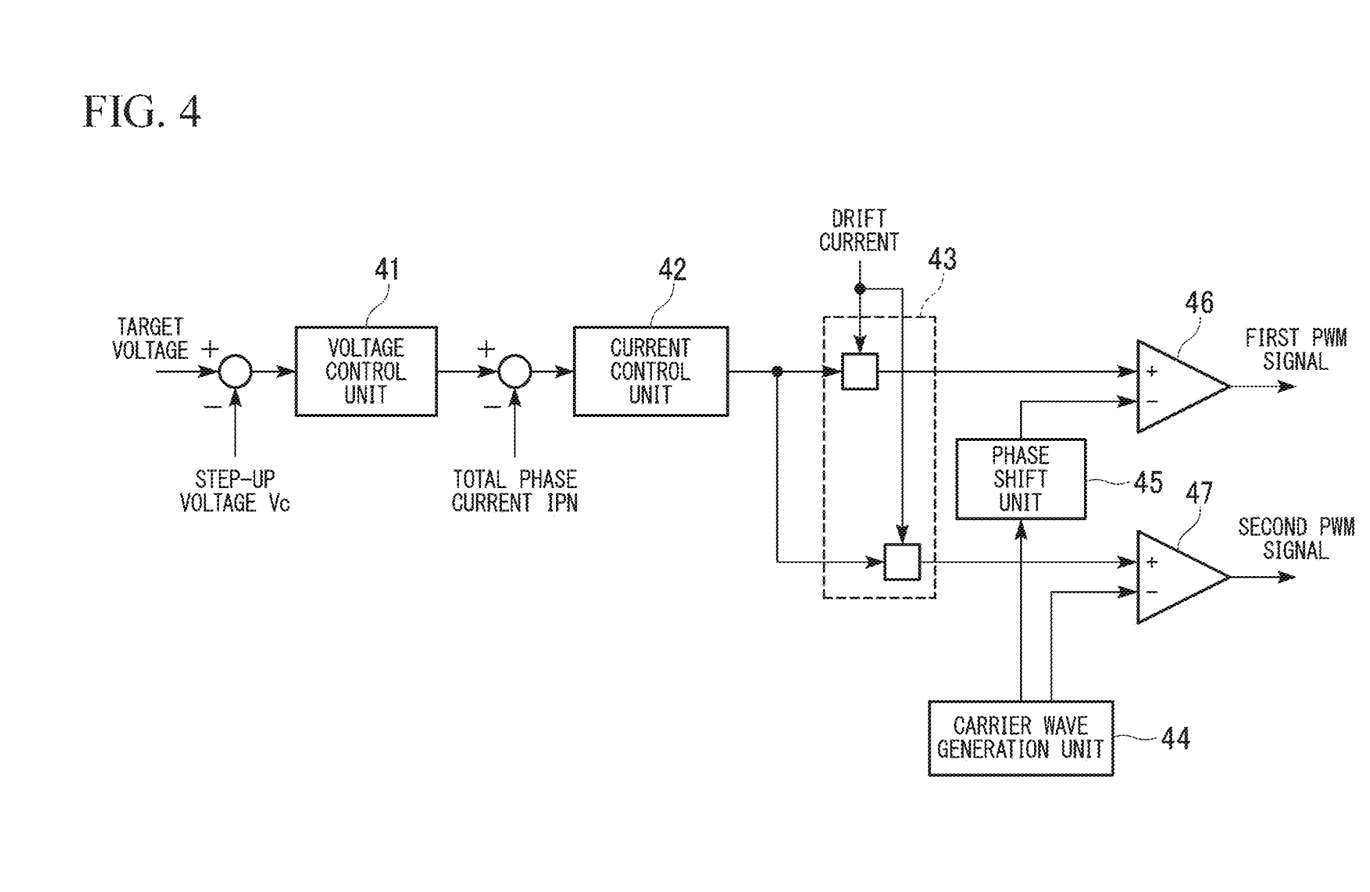
FIG. 4 is a schematic configuration diagram of a control unit 51 according to the present embodiment.

In the following description, a configuration of the control unit 51 according to the present embodiment will be described with reference to FIG. 4.

The control unit 51 includes a voltage control unit 41, a current control unit 42, a correction unit 43, a carrier wave generation unit 44, a phase shift unit 45, and comparison units 46 and 47.

The voltage control unit 41 performs a PI calculation on a deviation between the step-up voltage Vc detected by the voltage detection unit 25 and a target voltage set in advance to calculate a current command value for bringing this deviation closer to zero.

The current control unit 42 performs the PI calculation on a deviation between the current command value calculated by the voltage control unit 41 and the total phase current IPN acquired from the second acquisition unit 522 to calculate a switching command value D that is a signal for bringing this deviation closer to zero.

The correction unit 43 corrects the switching command value D calculated by the current control unit 42 to a switching command value D' for suppressing the drift current detected by the drift current detection unit 52 to suppress the drift current. For example, the correction unit 43 generates a switching command value D' (D1') by adding a value obtained by multiplying the drift current detected by the drift current detection unit 52 by a predetermined coefficient to the switching command value D, and outputs it to the comparison unit 46. In addition, the correction unit 43 generates a switching command value D' (D2') by subtracting the value obtained by multiplying the drift current detected by the drift current detection unit 52 by a predetermined coefficient with respect to the switching command value D and outputs it to the comparison unit 47.

The carrier wave generation unit 44 generates the carrier wave described above and outputs it to the phase shift unit 45 and the comparison unit 47.

The phase shift unit 45 shifts a phase of the carrier wave from the carrier wave generation unit 44 by, for example, 180°. As a result, the switching element Q2 and the switching element Q4 are alternately controlled to be in an on state. The phase shift unit 45 outputs the phase-shifted carrier wave to the comparison unit 46.

The comparison unit 46 generates a first PWM signal by comparing a switching command value D1' and the carrier wave output from the phase shift unit 45 and outputs the first PWM signal to the power module P1. As a result, the control unit 51 can perform PWM control on the switching elements Q1 and Q2.

The comparison unit 47 generates a second PWM signal by comparing a switching command value D2' and the carrier wave output from the carrier wave generation unit 44 and outputs the second PWM signal to the power module P2. As a result, the control unit 51 can perform PWM control on the switching elements Q3 and Q4.

As described above, the power conversion device 1 according to the present embodiment includes a single current sensor 26 and a drift current detection unit 52. The single current sensor 26 is provided on the primary sides of the chopper circuits 22 and 23, and detects a phase current flowing through each of the reactors L1 and L2 when the switching elements Q2 and Q4 are in both of the on state and an off state. The drift current detection unit 52 detects a drift current of a phase current flowing through the reactor L1 and a phase current flowing through the reactor L2 on the basis of the phase current detected by the current sensor 26. Then, the current sensor 26 detects a phase current such that directions of the phase currents flowing through the reactors L1 and L2 are the same.

With such a configuration, a value of the phase current detected by the current sensor 26 does not become small. Therefore, the power conversion device 1 according to the present embodiment can improve the detection accuracy of the drift current.

In addition, the current sensor 26 may be provided on the primary sides of the chopper circuits 22 and 23. For this reason, the current sensor 26 detects the phase current before it is stepped up by the chopper circuits 22 and 23 and calculates the drift current on the basis of this detected phase current. As a result, the drift current detection unit 52 can detect the drift current more accurately without being influenced by a switching loss occurring when the switching elements Q1 to Q4 are driven.

For example, if the current sensor 26 is provided on a high-voltage side of the chopper circuits 22 and 23, a switching element of the inverter 3 may be driven according to a traveling state of a vehicle, and an alternating component of a current flowing when the switching element is driven may affect the current sensor 26. For this reason, if the current sensor 26 is provided on the high voltage side of the chopper circuits 22 and 23, the current sensor 26 may not be able to accurately detect a current flowing through the reactors L1 and L2. The current sensor 26 according to the present embodiment may also be provided on a primary side that is a low voltage side of the chopper circuits 22 and 23. For this reason, the alternating component of the current does not affect the current sensor 26. Therefore, the current sensor 26 of the present embodiment can accurately detect the current flowing through the reactors L1 and L2.

The control device 5 of the present embodiment detects a current value and a drift current value of a single current sensor 26. The current control unit 42 of the control device 5 obtains the switching command value D on the basis of the current command value and the current value. The correction unit 43 of the control device 5 corrects the switching command value D to the switching command value D' for controlling a corresponding drift current. That is, the control device 5 controls a current of a phase current and suppresses a drift current using a single current sensor 26. For this reason, the control device 5 can eliminate a difference in detection sensitivity (variation) of parts due to use of a plurality of current sensors, as compared to a case in which it controls the current of a phase current and suppresses a drift current using a plurality of current sensors. The control device 5 can control a drift current more accurately than a configuration in which the plurality of current sensors are used. If the control device controls the current of a phase current and suppresses a drift current using the plurality of current sensors, for example, the control device may control the current on the basis of a value measured by a first current sensor, and may suppress the drift current on the basis of a value measured by a second current sensor that is different from the first current sensor.

Furthermore, since the reactors L1 and L2 are magnetically coupled to each other, they have a direct current superimposition characteristic. Therefore, there is a significant difference between the change point phase current IA and the change point phase current IB, which are maximum values of the total phase current IPN detected by the current sensor 26. For this reason, the power conversion device 1 can calculate a current deviation on the basis of values of the change point phase current IA and the change point phase current IB and can detect a drift current more accurately.

Although an embodiment of the present invention has been described above in detail with reference to the drawings, the present invention is not limited to this embodiment, and designs within a range not departing from the gist of the present invention are also included.

For example, in the present embodiment, the current control unit 42 may cause a proportional gain of the PI calculation to change on the basis of self-inductance components and mutual-inductance components of the reactors L1 and L2. As a result, the current control unit 42 can improve responsiveness of the current sensor 26.

In the embodiment described above, the control device 5 may determine whether a current output from the multi-phase converter 2 is an over-current when the total phase current IPN detected by the current sensor 26 exceeds a predetermined value. As a result, the power conversion device 1 does not need to separately include a current sensor that detects an over-current.

In the embodiment described above, the current sensor 26 is disposed to detect a phase current flowing through wiring (for example, a bus bar) for connecting the reactors L1 and L2 and the power modules P1 and P2, but the present invention is not limited thereto. For example, the current sensor 26 may also be disposed between the positive terminal of the DC power supply E and a connection point of a first end of the reactor L1 and a first end of the reactor L2. That is, the current sensor 26 may also be installed at any position on the primary side of the multi-phase converter 2 as long as it can acquire a current flowing through the reactors L1 and L2.

In the embodiment described above, the drift current detection unit 52 and the control unit 51 may be integrally configured or may be mechanically configured separately. For example, the power conversion device 1 according to the present embodiment may include a drift current detection device configured separately from the control device 5, the drift current detection device may have a function of the drift current detection unit 52, and the control device 5 may also have a function of the control unit 51.

INDUSTRIAL APPLICABILITY

According to the power conversion device described above, it is possible to improve the detection accuracy of a drift current in a multi-phase converter.

REFERENCE SIGNS LIST

1 Power conversion device
2 Multi-phase converter
5 Control device
22, 23 Chopper circuit
L1, L2 Reactor
P1, P2 Power module
Q1 to Q4 Switching element
26 Current sensor
52 Drift current detection unit

The invention claimed is:

1. A power conversion device having a multi-phase converter in which a plurality of chopper circuits each including a switching element and a reactor connected to the switching element are connected in parallel, the power conversion device comprising:
a single current sensor that is provided on a primary side of the chopper circuit and detects a phase current flowing through each of the reactors when the switching elements are in both an on state and an off state; and
a drift current detection unit configured to detect a drift current of a phase current in the multi-phase converter on a basis of the phase current detected by the current sensor,
wherein
the current sensor detects a phase current which is a total of a first phase current flowing through a first reactor of the reactors and a second phase current flowing through a second reactor of the reactors such that directions of the first and second phase currents flowing through each of the reactors are the same,
wherein
the primary side of the chopper circuit is between:

a connection point between the power conversion device and a positive terminal of a power supply to which the power conversion device is connected; and
a connection point between the reactors and the switching elements,
wherein the drift current detection unit detects the drift current on a basis of a change point phase current that is a phase current when the phase current detected by the current sensor changes from an increase to a decrease,
wherein the drift current detection unit detects a current difference between a plurality of the change point phase currents detected by the current sensor as the drift current, and
wherein the power conversion device further comprises:
a delay unit configured to delay the total of the first phase current and the second phase current input from the current sensor by a predetermined time; and
a control device including:
a first acquisition unit which acquires the total of the first phase current and the second phase current delayed by the predetermined time; and
a second acquisition unit which acquires the total of the first phase current and the second phase current from the current sensor without a delay.

2. The power conversion device according to claim 1, wherein
when each of the switching elements is switched from an on state to an off state, the drift current detection unit acquires the phase current detected by the current sensor as the change point phase current.

3. The power conversion device according to claim 1, wherein
the drift current detection unit acquires the phase current from the current sensor at a first timing, and
the predetermined time is a time difference between a second timing at which the switching element is switched from an on state to an off state and the first timing.

4. The power conversion device according to claim 1, wherein
the reactors are magnetically coupled to each other.

5. The power conversion device according to claim 1, wherein
the multi-phase converter is a two-phase converter in which two of the chopper circuits are connected to each other in parallel.

* * * * *